(12) United States Patent
Heilshov

(10) Patent No.: US 6,272,964 B1
(45) Date of Patent: Aug. 14, 2001

(54) BAND SAW BLADE GUIDE

(76) Inventor: Torben Heilshov, 795 Coast View Dr., Laguna Beach, CA (US) 92651

( * ) Notice: Subject to any disclaimer, the term of this patent is extended or adjusted under 35 U.S.C. 154(b) by 0 days.

(21) Appl. No.: 09/478,111

(22) Filed: Jan. 4, 2000

(51) Int. Cl.$^7$ ...................................................... B26D 5/00
(52) U.S. Cl. ............................... 83/821; 83/824; 83/828; 83/827
(58) Field of Search ...................... 83/820, 821, 827, 83/828, 829, 824

(56) References Cited

U.S. PATENT DOCUMENTS

| | | |
|---|---|---|
| 406,209 | 7/1889 | Gilmore . |
| 516,677 | 3/1894 | Cross . |
| 1,374,600 | 4/1921 | Newell . |
| 2,193,946 | 3/1940 | Tautz . |
| 2,472,570 | 6/1949 | Christie . |
| 2,695,637 | 11/1954 | Ocenasek . |
| 3,116,768 | 1/1964 | Lasar . |
| 3,145,604 | 8/1964 | Foley . |
| 3,540,334 | 11/1970 | McLauchlan . |
| 4,160,320 * | 7/1979 | Wikoff .................................. 83/817 |
| 4,179,966 * | 12/1979 | Ginnow et al. ......................... 83/820 |
| 4,212,104 * | 7/1980 | Wikoff .................................. 30/380 |
| 4,237,757 | 12/1980 | Bonac . |
| 4,258,601 | 3/1981 | Tanabe . |
| 4,327,621 | 5/1982 | Voorhees et al. . |
| 4,332,084 * | 6/1982 | Lovas et al. ............................. 83/795 |
| 4,920,846 | 5/1990 | Duginske et al. . |
| 4,972,746 | 11/1990 | Ohnishi et al. . |
| 5,067,381 | 11/1991 | Ohnishi et al. . |
| 5,119,705 | 6/1992 | Rosenberger et al. . |
| 5,127,297 | 7/1992 | Ohnishi et al. . |
| 5,271,306 | 12/1993 | Ohnishi et al. . |
| 5,301,586 | 4/1994 | Ohnishi et al. . |
| 5,408,910 | 4/1995 | Ohnishi et al. . |
| 5,410,934 | 5/1995 | Krippelz . |

FOREIGN PATENT DOCUMENTS

2666536 * 3/1992 (FR) ....................................... 83/820

* cited by examiner

Primary Examiner—M. Rachuba
(74) Attorney, Agent, or Firm—Stetina Brunda Garred & Brucker

(57) ABSTRACT

A throat plate blade guide for insertion into the work table of a band saw. The blade guide first includes a plate having a blade slot to permit a band saw blade to travel therethrough. The plate additionally has opposed blade guide structures juxtaposed with the blade slot on opposite sides of the band saw blade to limit lateral motion of the band saw blade. In the preferred embodiment, the blade guide also includes blade guide adjustors for adjusting the distance between the respective blade guide structures and the band saw blade.

9 Claims, 3 Drawing Sheets

BAND SAW BLADE GUIDE

CROSS-REFERENCE TO RELATED APPLICATIONS (Not Applicable)

STATEMENT RE: FEDERALLY SPONSORED RESEARCH/DEVELOPMENT (Not Applicable)

FIELD OF THE INVENTION

The present invention relates generally to a blade guide for a band saw blade, and more particularly to a blade guide positionable in a band saw work table and having integral therewith blade guide structures for maintaining lateral blade stability.

BACKGROUND OF THE INVENTION

Band saw machines generally comprise a continuous flexible metal blade that is trained around a pair of vertically stacked wheels so that the blade may perform cutting operations when the wheels are driven. The wheels may be fixed in a single position, or they may be rotatable to facilitate angular cuts. In either case, band saw machines typically have a work table disposed within the path of the band saw blade to stabilize and position the workpiece for cutting. By necessity, the work tables must have an aperture to permit the band saw blade to travel through the plane of the work table. This aperture is generally much larger than the blade in order to accommodate different blade sizes or to permit rotation of the wheels and blade. For this reason, a slotted throat plate insert is usually placed within the work table aperture to cover the void.

During operation of the band saw machine, the flexible metal blade tends to move in a side to side lateral motion. Lateral motion is undesirable because it reduces the accuracy of the cut and it may cause the blade teeth to strike the workpiece at an angle which scars the workpiece or damages the teeth. If lateral motion is unchecked, the blade may also experience noisy or even catastrophic vibration. In order to minimize lateral motion and vibration, band saws generally have blade guides to restrict movement of the band saw blade. Each blade guide typically comprises a pair of opposed members positioned on either side of the band saw blade a distance away from the work table. In the prior art, one blade guide is typically positioned above the work table and another is positioned below the work table. However, because of the respective distances between the blade guides and the workpiece, lateral blade movement continues to create difficulties in precise machine operations. Specifically, there is a greater tendency for lateral blade movement as the distance between the workpiece and the respective blade guides is increased. Unfortunately, the lower blade guide is generally positioned below the worktable and significantly distant from the workpiece resting thereon. Moreover, band saw machines having a rotatable wheel assembly or a tiltable work table typically position the lower blade guide further from the work table to allow such rotation.

In view of the above considerations, a primary object of the present invention is to provide a blade guide which can be positioned within the plane of the work table in close proximity to the workpiece to effectively restrict lateral motion of the band saw blade. Another object of the invention is to provide a blade guide which is an integral component of a throat plate that is positionable within the work table. Yet another object of the invention is to provide a blade guide having adjustable opposed guide blocks. These and other objects of the present invention will become apparent throughout the description thereof which now follows.

SUMMARY OF THE INVENTION

The present invention is a throat plate blade guide for insertion into the work table of a band saw. The blade guide first includes a plate having a blade slot to permit a band saw blade to travel therethrough. The plate additionally has opposed blade guide structures juxtaposed with the blade slot on opposite sides of the blade for limiting lateral motion of the blade. In the preferred embodiment, the blade guide also includes blade guide adjustors for adjusting the distance between the respective blade guide structures and the band saw blade.

The present invention here taught thus provides a blade guide which can be positioned within the plane of the work table in close proximity to the workpiece. The invention also provides a blade guide which is integral to the throat plate wherein the position of the guide structures can be adjusted to accommodate band saw blades of varying thickness. In this manner, lateral movement of the band saw blade can be minimized.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
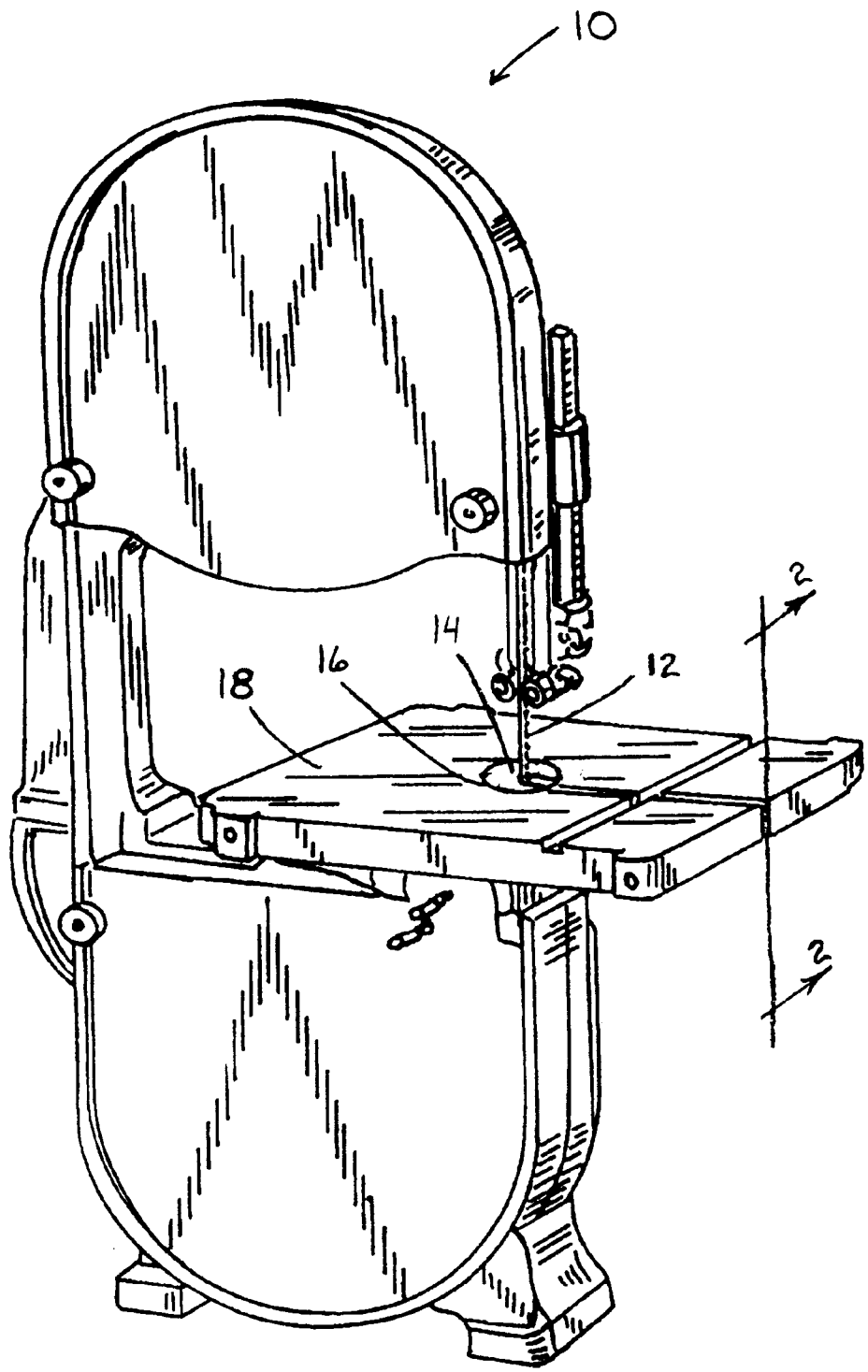
FIG. 1 is a perspective view of a band saw showing the band saw blade, upper blade guide, the band saw work table, and a prior art throat plate seated within the work table aperture.
Figure 2:
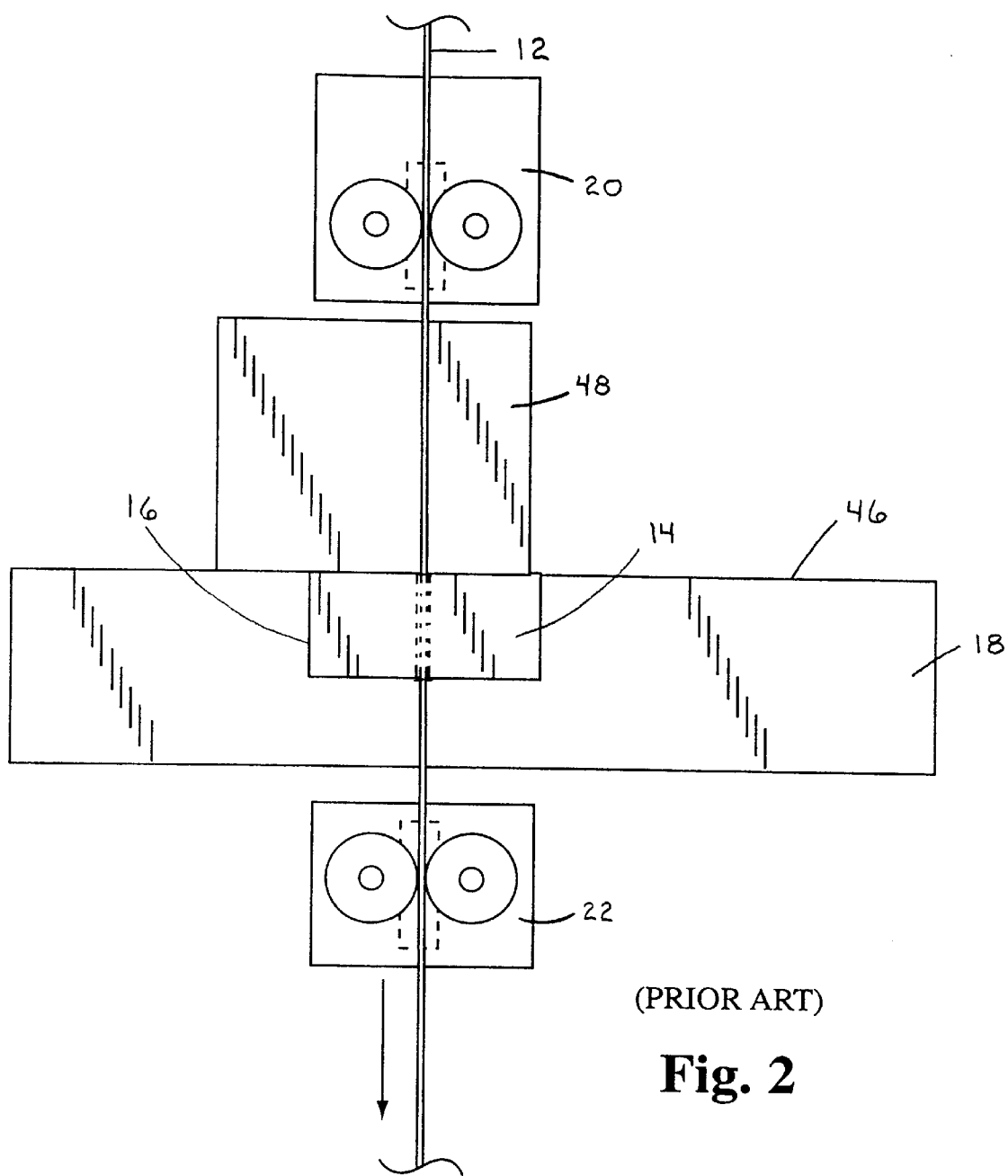
FIG. 2 is a schematic view of the band saw of FIG. 1 along line 2—2 thereof showing the blade guides and the work table throat plate.
Figure 3:
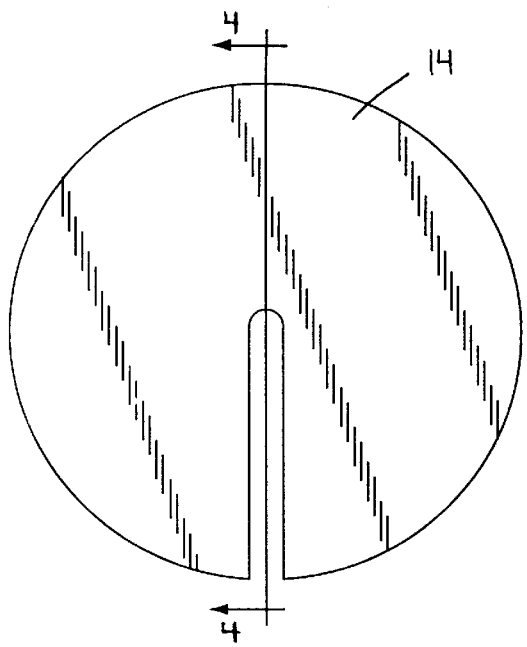
FIG. 3 is a top plan view of the throat plate of FIG. 1.
Figure 4:
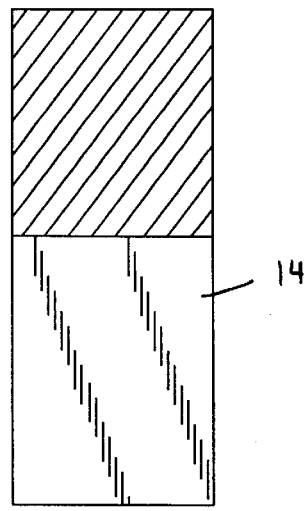
FIG. 4 is a cross-sectional view of the throat plate of FIG. 3 along line 4—4 thereof.

FIG. 1 shows a typical band saw machine 10 with a vertically traveling band saw blade 12 extending through a slotted prior art throat plate 14 and an aperture 16 disposed on a band saw work table 18. FIG. 2 shows the upper blade guide 20 and lower blade guide 22 disposed at a distance from the work table 18, while FIGS. 3 and 4 show a typical prior art throat plate 14 whose sole function is to provide a passage for blade travel without any control of lateral blade movement. As is apparent from FIGS. 2–4, the prior art throat plate 14 is not the primary means to laterally restrain the band saw blade 12.

Figure 5:
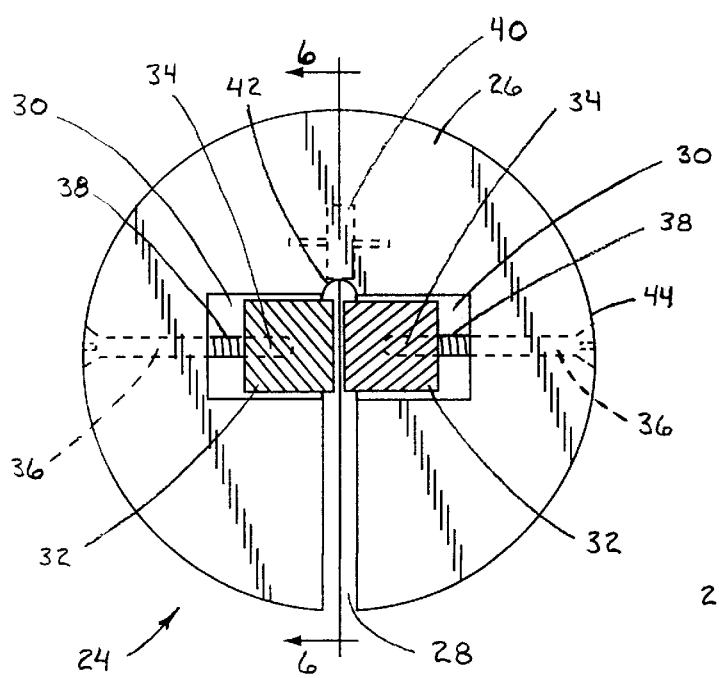
FIG. 5 is a top plan view partially in section of the throat plate blade guide according to the present invention.
Figure 6:
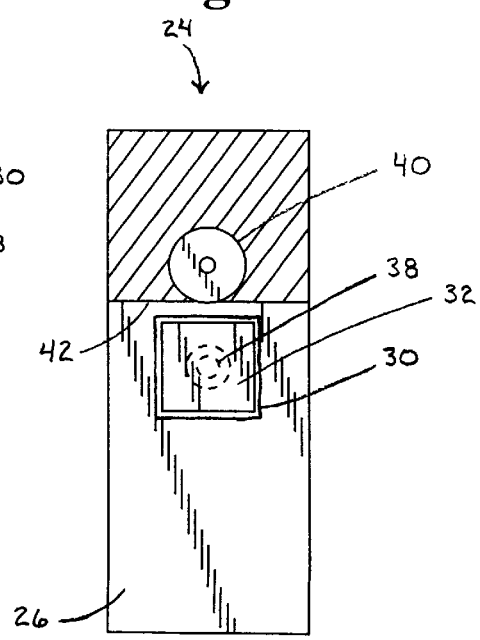
FIG. 6 is a cross-sectional view of the throat plate blade guide of FIG. 5 along line 6—6 thereof.

Referring to FIGS. 5 and 6, there is shown the presently preferred embodiment of a throat plate blade guide 24 for insertion into an aperture 16 disposed on a band saw work table 18. The throat plate blade guide comprises a throat plate 26 having a blade slot 28 sized to permit a band saw blade 12 to travel therethrough. As particularly shown in FIG. 5, the blade slot has a pair of recesses 30 disposed on opposite sides of the band saw blade 12 sized to receive a pair of opposed guide blocks 32 and shaped to substantially prevent rotation of the guide blocks 32. The opposed guide blocks 32 have a threaded bore 34 disposed to substantially align with a compatible throat plate threaded bore 36 for insertion of a countersunk set screw 38 therethrough. The guide blocks 32 may be non-limitedly formed from TEFLON, wood, plastic, fiberglass, metal, composite or similar materials having a low coefficient of friction. Alternatively, roller bearings may be substituted for the guide blocks. In the preferred embodiment, the throat plate blade guide 24 additionally has a roller thrust bearing 40 disposed substantially tangential to the rear surface 42 of the blade slot 28 to prevent longitudinal movement of the band saw blade.

In operation, a user turns the countersunk set screws 38 to position the guide blocks 32 within the blade slot 28 to accommodate a particular band saw blade 12. Once so adjusted, the throat plate blade guide 24 is inserted into the aperture 16 of the band saw work table 18. To facilitate insertion, the countersunk set screw 36 is substantially flush with the throat plate outer surface 44. In addition, the throat plate blade guide 24 is sized to be substantially flush with the work table top surface 46 to allow manipulation of the workpiece 48 disposed on the work table 18.

As is apparent from the above embodiment, the throat plate blade guide resolves many of the deficiencies in the prior art. In particular, the blade guide of the present invention will be disposed within the plane of the band saw work table in close proximity to the workpiece 48. Additionally, the blade guide of the present invention is an integral component of the throat plate, and the blade guide is adjustable to further minimize lateral movement of the band saw blade.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A throat plate blade guide for insertion into a work table of a band saw comprising:
   a) a plate having a blade slot to permit a band saw blade to travel therethrough, said plate insertable into the work table of the band saw; and
   b) opposed blade guide structures projecting into the blade slot from opposite sides of the blade slot for limiting the lateral motion of the band saw blade.

2. The throat plate blade guide as claimed in claim 1 wherein the blade guide structures are blocks.

3. The throat plate blade guide as claimed in claim 1 additionally comprising blade guide adjustors for adjusting the lateral positions of the blade guide structures to thereby adjust the distance between the respective blade guide structures.

4. The throat plate blade guide as claimed in claim 3 wherein the blade guide adjustors are externally accessible set screws having distal ends disposed within respective bores of the two guide structures.

5. The throat plate blade guide as claimed in claim 1 wherein the plate additionally comprises a pair of opposed recesses each sized to receive one respective guide structure and shaped to substantially prevent rotation of the respective guide structures.

6. The throat plate blade guide as claimed in claim 1 wherein the throat plate blade guide additionally comprises a thrust bearing projecting into the blade slot for limiting longitudinal movement of the band saw blade.

7. A band saw work table comprising a blade guide for a band saw blade, said blade guide comprising a blade slot and opposed blade guide structures projecting from opposite sides into the blade slot for limiting lateral motion of said blade.

8. A band saw work table as claimed in claim 7 additionally comprising blade guide adjustors for adjusting the lateral positions of the blade guide structures to thereby adjust the distance between the respective blade guide structures.

9. A band saw work table as claimed in claim 8 wherein the blade guide adjustors are externally accessible set screws.

* * * * *

UNITED STATES PATENT AND TRADEMARK OFFICE
CERTIFICATE OF CORRECTION

PATENT NO.   : 6,272,964 B1  
DATED        : August 14, 2001  
INVENTOR(S)  : Torben Helshoj Page 1 of 1

It is certified that error appears in the above-identified patent and that said Letters Patent is hereby corrected as shown below:

<u>Title page,</u>
Item [76], Inventor, Torben Helshoj, 795 Coast View Dr., Laguna Beach, CA (US) 92651

Signed and Sealed this

Sixteenth Day of April, 2002

*Attest:*

JAMES E. ROGAN
*Attesting Officer*        *Director of the United States Patent and Trademark Office*